(12) United States Patent
Meuleau

(10) Patent No.: US 9,405,293 B2
(45) Date of Patent: Aug. 2, 2016

(54) VEHICLE TRAJECTORY OPTIMIZATION FOR AUTONOMOUS VEHICLES

(71) Applicant: Nissan North America, Inc., Franklin, TN (US)

(72) Inventor: Nicolas Meuleau, San Francisco, CA (US)

(73) Assignee: NISSAN NORTH AMERICA, INC, Franklin, TN (US)

( * ) Notice: Subject to any disclaimer, the term of this patent is extended or adjusted under 35 U.S.C. 154(b) by 60 days.

(21) Appl. No.: 14/291,411

(22) Filed: May 30, 2014

(65) Prior Publication Data

US 2015/0345959 A1    Dec. 3, 2015

(51) Int. Cl.
| | |
|---|---|
| G05D 1/00 | (2006.01) |
| G01C 21/34 | (2006.01) |
| G06Q 10/04 | (2012.01) |
| G05D 1/02 | (2006.01) |
| G01C 21/26 | (2006.01) |
| B62D 15/00 | (2006.01) |

(52) U.S. Cl.
CPC .............. *G05D 1/0212* (2013.01); *B62D 15/00* (2013.01); *G01C 21/26* (2013.01); *G01C 21/34* (2013.01); *G05D 1/0088* (2013.01); *G05D 1/021* (2013.01); *G05D 1/0217* (2013.01); *G06Q 10/047* (2013.01); *G05D 1/0268* (2013.01); *G05D 1/0278* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 4,862,047 A | * | 8/1989 | Suzuki | G01C 21/20 318/580 |
| 5,229,941 A | * | 7/1993 | Hattori | G05D 1/0217 180/167 |
| 5,410,346 A | * | 4/1995 | Saneyoshi | B60R 1/00 348/116 |
| 5,928,294 A | * | 7/1999 | Zelinkovsky | G05D 1/0265 180/168 |
| 6,278,928 B1 | * | 8/2001 | Aruga | F16H 59/66 477/97 |
| 7,003,752 B2 | * | 2/2006 | Teig | G06F 17/5077 716/129 |
| 9,120,485 B1 | * | 9/2015 | Dolgov | B60W 30/10 |
| 2002/0065603 A1 | * | 5/2002 | Watanabe | G01C 21/30 701/446 |
| 2007/0129885 A1 | * | 6/2007 | Wellmann | G01C 21/3446 701/428 |

(Continued)

OTHER PUBLICATIONS

Diebel, James et al. Practical Search Techniques in Path Planning for Autonomous Driving. American Association for Artifical Intelligence (www.aaai.org). 2008.*

(Continued)

*Primary Examiner* — Rami Khatib
*Assistant Examiner* — Jeffrey Boomer
(74) *Attorney, Agent, or Firm* — Young Basile Hanlon & MacFarlane, P.C.

(57) ABSTRACT

A method for controlling an autonomous vehicle includes obtaining information describing a roadway; defining a plurality of layers along the roadway between a starting position and a goal position, each layer having a first width, and each layer having a plurality of nodes that are spaced from one another transversely with respect to the roadway within the first width; and determining a first trajectory from the starting position to the goal position, by minimizing a cost value associated with traversing the layers. Determining the first trajectory includes, for each layer, determining layer-specific weighting factors for each of a plurality of cost components, based on information associated with the respective layer, and determining, for each node of the respective layer, a cost for travelling to one or more of the nodes in a subsequent layer based on the plurality of cost components and the layer-specific weighting factors.

15 Claims, 5 Drawing Sheets

(56) References Cited

U.S. PATENT DOCUMENTS

| | | | | |
|---|---|---|---|---|
| 2007/0233386 | A1* | 10/2007 | Saito | B62D 15/025 701/300 |
| 2008/0021635 | A1* | 1/2008 | Lohmiller | G05D 1/0202 701/533 |
| 2010/0082195 | A1* | 4/2010 | Lee | B62D 15/025 701/25 |
| 2010/0253599 | A1* | 10/2010 | Szczerba | G01S 13/723 345/7 |
| 2011/0169958 | A1* | 7/2011 | Imai | B60W 30/12 348/149 |
| 2014/0050362 | A1* | 2/2014 | Park | G06K 9/00791 382/104 |
| 2014/0207325 | A1* | 7/2014 | Mudalige | B62D 15/025 701/26 |
| 2014/0277897 | A1* | 9/2014 | Saiz | B60W 10/06 701/23 |
| 2014/0278095 | A1* | 9/2014 | Kaehler | G05D 1/0212 701/533 |
| 2014/0303828 | A1* | 10/2014 | Joshi | G05D 1/021 701/23 |
| 2015/0120138 | A1* | 4/2015 | Zeng | B62D 15/0265 701/41 |
| 2015/0197246 | A1* | 7/2015 | Nagasaka | G01C 21/26 701/1 |
| 2015/0316386 | A1* | 11/2015 | Delp | G01C 21/3658 701/532 |
| 2016/0102984 | A1* | 4/2016 | Dorum | G01C 21/26 701/409 |

OTHER PUBLICATIONS

Wikipedia. Dijkstra's algorithm. Arichived by archive.org on Apr. 25, 2013. Accessed on Sep. 16, 2015.*

Thomas Howard and Alonzo Kelly, "Optimal Rough Terrain Trajectory Generation for Wheeled Mobile Robots," International Journal of Robotics Research, Feb. 2007, pp. 141-166, vol. 26, No. 2, http://www.ri.cmu.edu/publication_view.html?pub_id=5739.

Macek et al., "Path Following for Autonomous Vehicle Navigation Based on Kinodynamic Control," Journal of Computing and Information Technology, CIT 17, 2009, 1, 17-26.

Wan et al., "Lane Change Behavior Modeling for Autonomous Vehicles Based on Surroundings Recognition," International Journal of Automotive Engineering 2 (2011) 7-12.

Reece et al., "A Computational Model of Driving for Autonomous Vehicles," School of Computer Science, Carnegie Mellon University, Apr. 1991, CMU-CS-91-122, Pittsburgh, Pennsylvania 15213.

Taylor et al., "A Comparative Study of Vision-Based Lateral Control Strategies for Autonomous Highway Driving," Computer and Information Science Dept. of the University of Pennsylvania and EECS Dept. of U. C. Berkeley, Philadelphia, Pennsylvania and Berkeley, California.

Wikipedia, "Dijkstra's algorithm", http://en.wikipedia.org/wiki/Dijkstra's_algorithm, downloaded May 30, 2014, 9 pp.

* cited by examiner

VEHICLE TRAJECTORY OPTIMIZATION FOR AUTONOMOUS VEHICLES

BACKGROUND

Autonomous vehicles are vehicles having computer control systems that attempt to perform the driving tasks that are conventionally performed by a human driver. Stated generally, the purpose of a control system of an autonomous vehicle is to guide the vehicle from a current location to a destination. In reality, multiple constraints are placed on the control system. For example, the route chosen by the control system might be constrained to travel along a public roadway, to avoid obstacles, and to travel in conformance with traffic laws. Travel upon public roadways along a determined route from a current location to a destination provides a basis for defining a geometric path that the vehicle will follow. Viewing vehicle control as a simple geometry problem will not, however, lead to acceptable control of the vehicle.

SUMMARY

The disclosure relates to systems and methods for vehicle trajectory optimization. One aspect of the disclosed embodiments is a method for controlling an autonomous vehicle that includes obtaining, by one or more processors, information describing a roadway from a starting position to a goal position and defining, by the one or more processors, a plurality of layers along the roadway at spaced locations between the starting position and the goal position. Each layer having a first width, and each layer having a plurality of nodes that are spaced from one another transversely with respect to the roadway within the first width. The method further includes determining, by the one or more processors, a first trajectory from the starting position to the goal position, by minimizing a cost value associated with traversing the layers. Determining the first trajectory includes, for each layer, determining layer-specific weighting factors for each of a plurality of cost components, based on information associated with the respective layer, and determining, for each node of the respective layer, a cost for travelling to one or more of the nodes in a subsequent layer based on the plurality of cost components and the layer-specific weighting factors.

Another aspect of the disclosed embodiments is a control apparatus for an autonomous vehicle that includes one or more processors and one or more memory devices for storing program instructions used by the one or more processors. The program instructions, when executed by the one or more processors, cause the one or more processors to obtain information describing a roadway from a starting position to a goal position and define a plurality of layers along the roadway at spaced locations between the starting position and the goal position. Each layer having a first width, and each layer having a plurality of nodes that are spaced from one another transversely with respect to the roadway within the first width. The program instructions further cause the one or more processors to determine a first trajectory from the starting position to the goal position, by minimizing a cost value associated with traversing the layers. Determining the first trajectory includes, for each layer, determining layer-specific weighting factors for each of a plurality of cost components, based on information associated with the respective layer, and determining, for each node of the respective layer, a cost for travelling to one or more of the nodes in a subsequent layer based on the plurality of cost components and the layer-specific weighting factors.

Another aspect of the disclosed embodiments is an autonomous vehicle that includes a trajectory planning system that includes one or more processors and one or more memory devices for storing program instructions used by the one or more processors, wherein the program instructions, when executed by the one or more processors, cause the one or more processors to obtain information describing a roadway from a starting position to a goal position, define a plurality of layers along the roadway at spaced locations between the starting position and the goal position, each layer having a first width, and each layer having a plurality of nodes that are spaced from one another transversely with respect to the roadway within the first width, and determine a first trajectory from the starting position to the goal position, by minimizing a cost value associated with traversing the layers. Determining the first trajectory includes, for each layer, determining layer-specific weighting factors for each of a plurality of cost components, based on information associated with the respective layer, and determining, for each node of the respective layer, a cost for travelling to one or more of the nodes in a subsequent layer based on the plurality of cost components and the layer-specific weighting factors. The autonomous vehicle also includes a steering device that is operable to change a steering angle of at least one steered wheel, and a steering control system operable to receive an input signal from the trajectory planning system and output a steering control signal to the steering device for controlling operation of the steering device.

BRIEF DESCRIPTION OF THE DRAWINGS

The description herein makes reference to the accompanying drawings wherein like reference numerals refer to like parts throughout the several views, and wherein.

DETAILED DESCRIPTION

Vehicle control schemes that set a trajectory that follows the middle (i.e. centerline or central track) of a lane on a roadway result in vehicle control that may feel unnatural to human occupants of a vehicle. Such a trajectory may also result in a higher distance travelled that is necessary.

The methods, control systems, and vehicles described herein utilize divide a roadway into layers that each have a group of nodes. For each layer, a cost associated with travelling from a node in a layer to a node in a subsequent layer is calculated based on multiple cost components. Layer-specific cost components are applied to each layer separately based on information associated with each layer.

Figure 1:
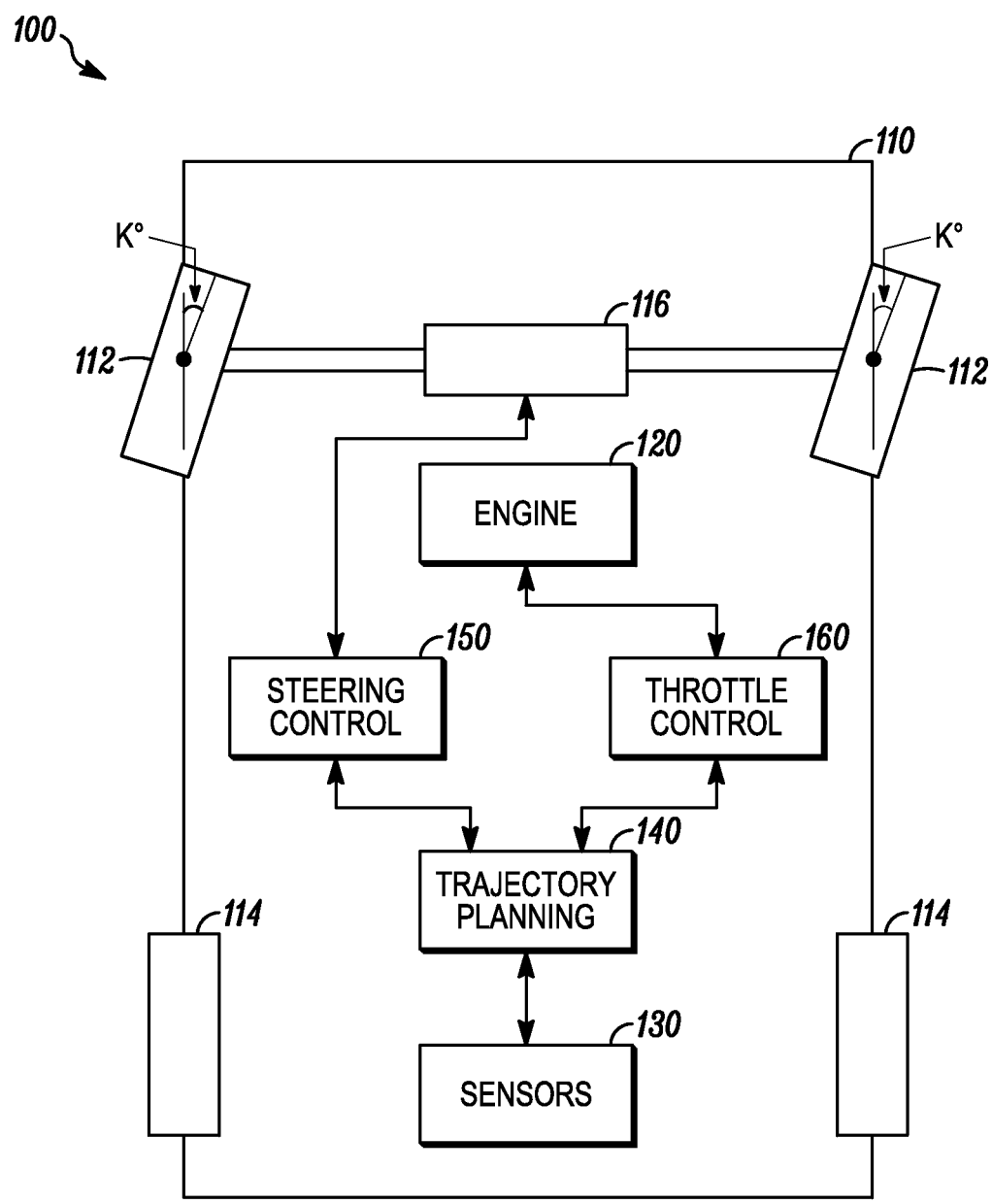
FIG. 1 is an illustration showing an autonomous vehicle.

FIG. 1 shows a vehicle 100, which is an autonomous vehicle that can be utilized as an environment for implementing the methods and control systems for vehicle trajectory planning that are disclosed herein. Except as otherwise noted, the vehicle 100 is conventional in nature. The systems and methods disclosed herein can be applied to many different types of vehicles of varied structural configurations, and thus, the disclosure herein is not limited to use with any particular kind of vehicle.

The vehicle 100 includes a chassis 110 that is fitted with conventional suspension, steering, braking, and drivetrain components. In the illustrated example, the chassis 110 is fitted with front wheels 112 and rear wheels 114. The front wheels 112 are steered wheels. That is, the front wheels 112 can be pivoted to a steering angle K under control of a steering device 116. The steering device 116 can be any conventional steering device, such as a rack and pinion steering system. The steering device 116 is mechanically coupled to the front wheels 112 to pivot them to the steering angle K. The steering device 116 can be electronically controllable. For example, the steering device 116 can include an electric motor that is operable to receive signals that cause operation of the steering device 116. For example, the steering device 116 can include a rack and pinion arrangement, where the rotational input of the rack is coupled to an electric motor in combination with a position sensor or encoder to allow the steering device 116 to cause the front wheels 112 to pivot to a desired steering angle K.

The vehicle 100 includes an engine 120. The engine 120 can be any manner of device or combination of devices operative to provide a motive force to one or more of the front wheels 112 or the rear wheels 114. As one example, the engine 120 can be an internal combustion engine. As another example, the engine 120 can be or include one or more electric motors. As another example, the engine 120 can be a hybrid propulsion system incorporating, for example, an internal combustion engine and one or more electric motors. Other examples are possible. The engine 120 is operable to drive one or more of the front wheels 112 and/or rear wheels 114 via conventional drivetrain components.

The vehicle 100 includes a plurality of sensors 130 that are operable to provide information that is used to control the vehicle. The sensors 130 are conventional in nature. Some of the sensors 130 provide information regarding current operating characteristics of the vehicle. These sensors can include, for example, a speed sensor, acceleration sensors, a steering angle sensor, traction-related sensors, braking-related sensors, and/or any sensor that is operable to report information regarding some aspect of the current dynamic situation of the vehicle 100.

The sensors 130 can also include sensors that are operable to obtain information regarding the physical environment surrounding the vehicle 100. For example, one or more sensors can be utilized to detect road geometry and obstacles, such as fixed obstacles, vehicles, and pedestrians. As an example, these sensors can be or include a plurality of video cameras, laser-sensing systems, infrared-sensing systems, acoustic-sensing systems, and/or any other suitable type of environmental sensing device now known or later developed.

The sensors 130 can also include navigation-related sensors. Examples of navigation related sensors include a compass (e.g. ma magnetometer), a satellite positioning system receiver (using, for example, the Global Positioning System), and a navigation system operable to obtain mapping and/or route information whether locally stored at the vehicle 100 or accessed remotely, such as by a wireless data transmission connection over any suitable protocol. These sensors can be used to obtain information that represents, for example, a current heading of the vehicle, a current position of the vehicle in two or three dimensions, a current angular orientation of the vehicle 100, and route information for the vehicle.

The vehicle 100 includes a trajectory planning system 140. The trajectory planning system 140 can include one or more processors (such as one or more conventional central processing units) that are operable to execute instructions that are stored on a computer readable storage device, such as RAM, ROM, a solid state memory device, or a disk drive.

The trajectory planning system 140 is operable to obtain information describing a current state of the vehicle 100 and a goal state for the vehicle 100, and, based on this information, to determine and optimize a trajectory for the vehicle 100, as will be described further herein. The outputs of the trajectory planning system 140 can include signals operable to cause control of the vehicle 100 such that the vehicle 100 follows the trajectory that is determined by the trajectory planning system 140. As one example, the output of the trajectory planning system can be an optimized trajectory that is supplied to one or more both of a steering control system 150 and a throttle control system 160. As one example, the optimized trajectory can be a list of positions (e.g. nodes) along a roadway. As another example, the optimized trajectory can be a list of control inputs such as a set of steering angles, with each steering angle corresponding to a point in time or a position. As another example, the optimized trajectory can be one or more paths, lines, and/or curves.

The steering control system 150 is operable to control operation of the steering device 116 in order to cause the steering device 116 to set a desired steering angle K for the front wheels 112 of the vehicle 100. In particular, the steering control system 150 can receive the optimized trajectory from the trajectory planning system 140, then generate and transmit a steering control system to the steering device based on the optimized trajectory. For example, the optimized trajectory that is received from the trajectory planning system 140 can be expressed as a vector of control inputs such as steering angles. The steering control system 150 can process these control inputs by regulating operation of the steering device 116 such that the steering angle specified by the vector of control inputs is obtained at the front wheels 112 as the vehicle 100 progresses along the trajectory that was determined by the trajectory planning system 140.

The throttle control system 160 can receive a velocity profile from the trajectory planning system 140 or can compute a velocity profile based on information received from the trajectory planning system 140 such as the vector of control inputs. Alternative factors or additional factors can be utilized to generate a velocity profile by the throttle control system 160, as is known in the art. The throttle control system 160 is operable to output throttle control signals to the engine 120 for regulating the power supplied by the engine 120 and thus regulating via the speed of the vehicle 100.

Figure 2:
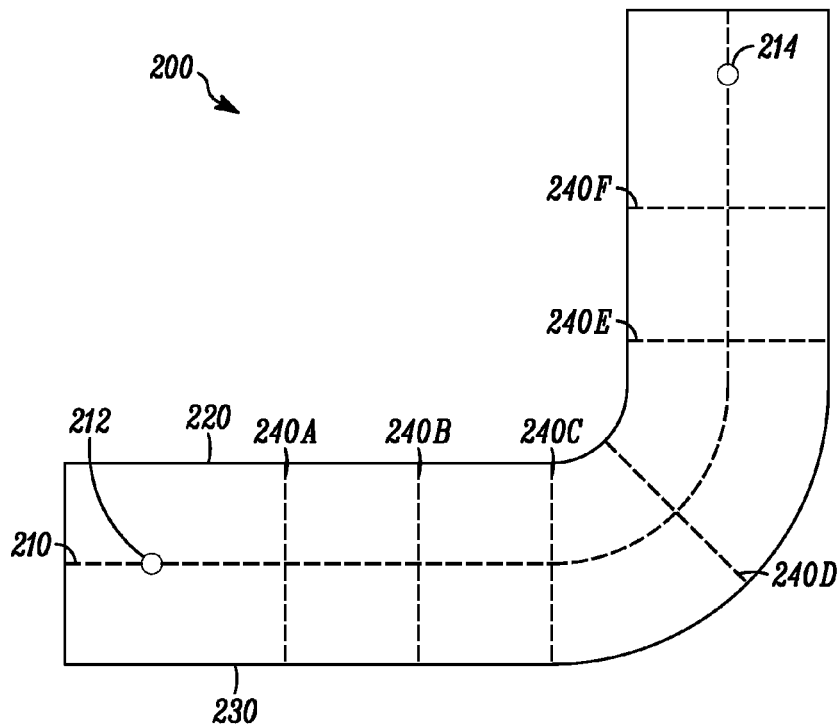
FIG. 2 is an illustration showing layers defined on a roadway from a starting position to a goal position.

FIG. 2 is an illustration showing a roadway 200. Information describing the roadway 200 can be obtained by the trajectory planning system 140 and used as a basis for planning a trajectory along the roadway 200.

The roadway 200 can be represented by a centerline or central track 210. The central track 210 can extend at least from a start position 212 to a goal position 214. The central track 210 can be positioned midway between a left edge line 220 and a right edge line 230. The left edge line 220 and the right edge line 230 need not correspond to the physical extents of a road or a lane on a road. As an example, the left edge line and the right edge line can be positions on the road that define boundaries for the acceptable position of a point on the vehicle 100, such as a center point on the vehicle 100.

Thus, the left edge line 220 and the right edge line could be offset inward (e.g. toward the center of the lane) from the left and right physical extents of the lane or road.

The trajectory planning system can analyze the roadway 200 by subdividing it into a plurality of layers. In the illustrated example, eight layers are defined, including a first layer 240*a*, a second layer 240*b*, a third layer 240*c*, a fourth layer 240*d*, a fifth layer 240*e*, and a sixth layer 240*f*.

Each of the layers 240*a*-240*f* can correspond to a longitudinal position along the roadway 200. Longitudinal positions along the roadway can be expressed as, for example, distances from a first position along the roadway 200 toward a second position along the roadway along a path that follows the central track 210 of the roadway 200. The first position can be the start position 212. The start position 212 can correspond to a current position of the vehicle 100 or an expected future position of the vehicle 100. The second position can be the goal position 214 for the vehicle 100. The goal position 214 can correspond to a desired future position for the vehicle 100.

In one example, the layers 240*a*-240*f* are positioned at spaced locations along the roadway 200 from a start position to a goal position. The layers 240*a*-240*f* can be spaced longitudinally along the roadway. The distances between successive pairs of layers 240*a*-240*f* can be constant or non-constant. As one example, the spacing between layers 240*a*-240*f* can decrease in proportion to the curvature of the roadway 200 at a particular location such that the spacing between layers 240*a*-240*f* is smaller within curves than on straight sections.

Figure 3:
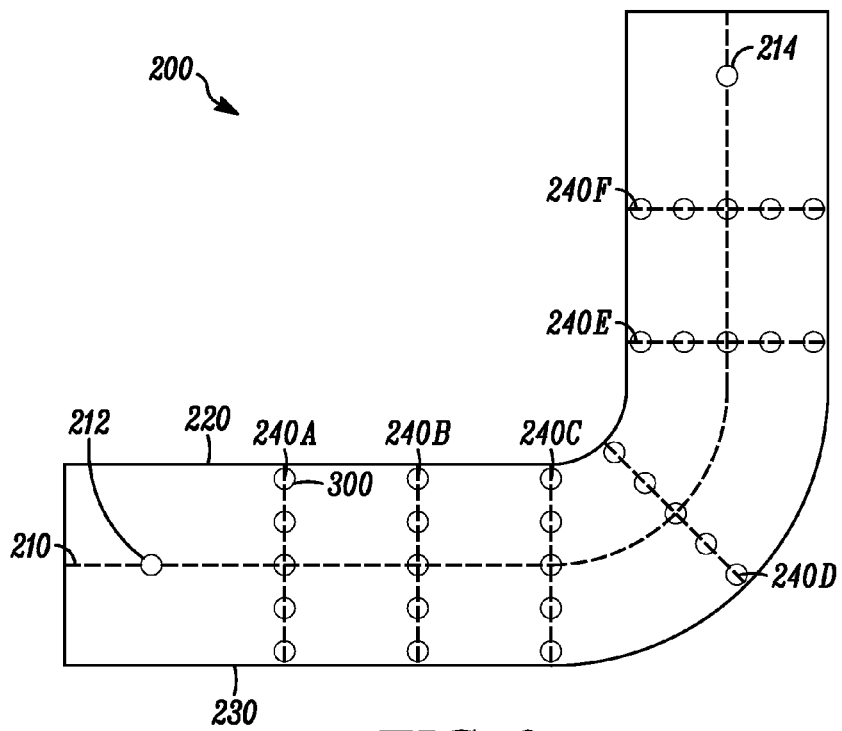
FIG. 3 is an illustration showing the roadway with a plurality of nodes positioned at each layer of the roadway.

As shown in FIG. 3, the trajectory planning system 140 can model each of the layers 240*a*-240*f* of the roadway 200 as having a plurality of nodes 300 that are spaced from one another transversely with respect to the roadway 200 within a width of each layer (sometimes referred to herein as a first width). In particular, each of the layers 240*a*-240*f* has a width that extends transverse the roadway (e.g. generally perpendicular to the central track 210 at the respective location of each of the layers 240*a*-240*f*). The width of each of the layers 240*a*-240*f* is defined by the maximum transverse distance between nodes in the layer. As one example, each of the layers 240*a*-240*f* can extend from the left edge line 220 to the right edge line 230 of the roadway 200, with nodes 300 positioned on each edge line, and this distance can be the width of each respective layer. As an alternative, the width of each layer can be defined in terms of a distance from the central track 210. The width of each of the layers 240*a*-240*f* is referred to herein as a first width. Other manners of arranging the nodes 300 in each layer can be used. In typical implementations, nodes 300 are positioned in the layers 240*a*-240*f* to define layer widths that extend a majority of the distance between the left edge line 220 and the right edge line 230.

The nodes 300 can be positioned at a desired transverse spacing within each layer. For instance, the nodes 300 can be positioned at a 10 centimeter spacing starting from the central track 210 and being located outward in the left and right transverse directions from the central track 210. In the illustrated example, five nodes 300 are shown in each layer. It is contemplated that a typical implementation will utilize more than five nodes 300 in each layer. In one implementation, each of the layers 240*a*-240*f* can include fifteen nodes.

Figure 4:
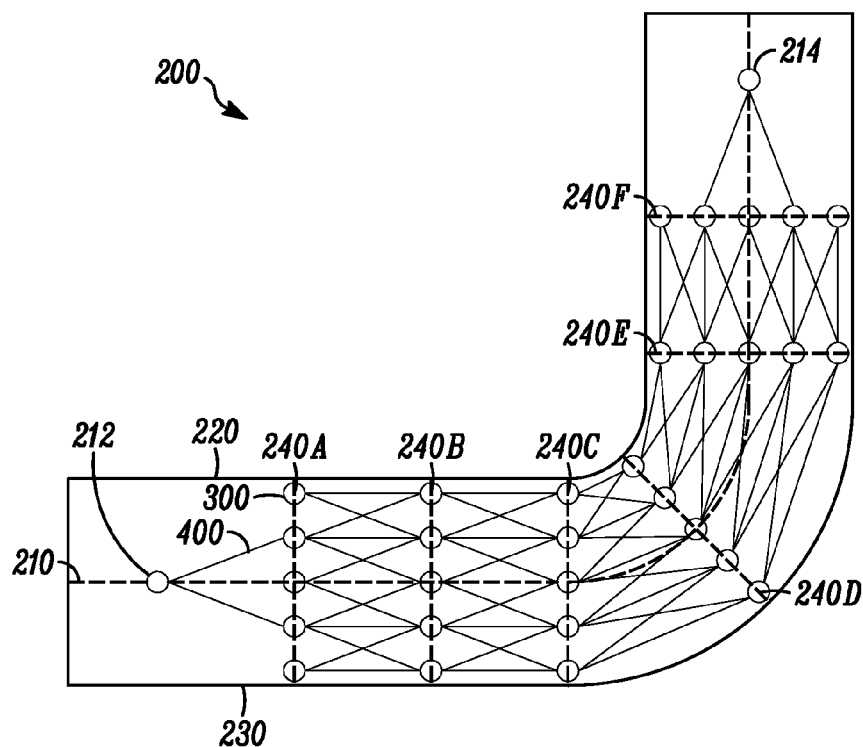
FIG. 4 is an illustration showing the roadway and potential paths between nodes.

FIG. 4 is an illustration showing the roadway and potential paths 400 between nodes. The paths 400 are constructed between the nodes 300 by the trajectory planning system 140 in order to allow analysis of possible trajectories from the start position 212 to the goal position 214. The paths 400 form a network that interconnects the start position 212 and the goal position 214 via the nodes 300 of the layers 240*a*-240*f*. The paths 400 represent routes along which the vehicle 100 could be guided from the start position 212 to the goal position 214. The trajectory planning system 140 can limit the number of paths in the network in order to reduce the number of potential trajectories that will be evaluated from the start position 212 to the goal position 214. As one example, the trajectory planning system can construct the network by excluding paths between nodes 300 that are part of the same layer. Thus, all of the paths 400 constructed by the trajectory planning system 140 will connect a node in a first layer with a node in a second layer that is adjacent to the first layer. As another example, the trajectory planning system can limit that number of other nodes that each node connects to by the paths 400. As previously noted, the nodes 300 are spaced transverse to the roadway 200 in each of the layers 240*a*-240*f*. Paths can be constructed with respect to nodes in a limited transverse width. In the illustrated example, each of the nodes 300 is connected to three nodes 300 in a successive adjacent layer, namely a node directly ahead (e.g. closest in transverse position), and the nodes to the immediate left and right of that node.

Figure 5:
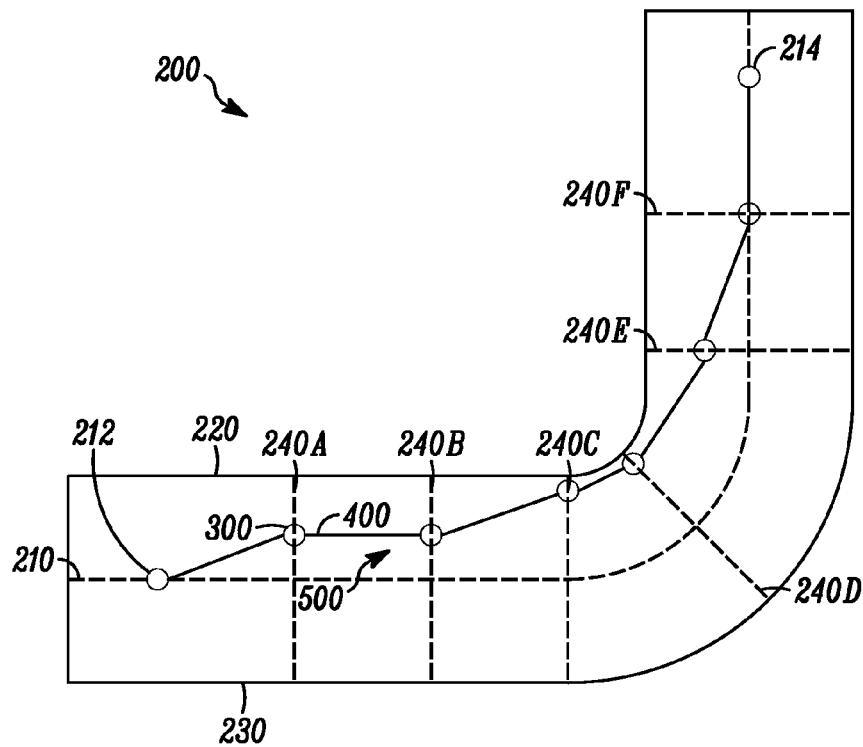
FIG. 5 is an illustration showing the roadway and a first trajectory defined on the roadway between the starting position and the goal position.

The trajectory planning system 140 analyzes the network of paths 400 to determine a first trajectory 500 from the start position 212 to the goal position 214, as shown in FIG. 5. The trajectory can be determined by assigning a cost value to each of the paths 400, and finding a trajectory that minimizes the cost of travelling from the start position to the goal position. Such a trajectory can be found, for example, using a graph search algorithm to identify a trajectory that minimizes a cost value associated with traversing the layers. Djikstra's algorithm is an example of a suitable algorithm that can be used to determine a lowest cost trajectory from the start position 212 to the goal position 214.

Each of the paths 400 is assigned a cost value. The cost value can be based on a plurality of cost components. The cost components each represent the desirability or undesirability of a certain characteristic of the path. One example of a cost component is a distance travelled value, which represents the distance that will be travelled by the vehicle 100 when traversing the path 400. Another example of a cost component is cross-track error value, which represents a deviation (i.e. transverse distance.) from the central track 210 of the roadway 200. Another example of a cost component is a lateral acceleration value that represents the lateral acceleration that will be experienced by the vehicle 100 as it traverses the path 400. The lateral acceleration value can be estimated by any suitable known method for determining lateral acceleration. As one example, the lateral acceleration value can be roughly estimated as the tangent of the angle by which the current path deviates from the prior path (i.e. the angle by which the vehicle will be required to turn at a node to follow the path 400 being analyzed).

The cost value can be determined in a manner that applies weights to each cost component. Thus, the cost value is determined by weighting each cost component and summing the cost components. For example, the distance travelled value can by weighted by a distance weight, the cross-track error value can be weighted by a cross-track error weight, and the lateral acceleration value can be weighted by a lateral acceleration weight.

The weighting values can be layer specific. Thus, for each of the layers 240*a*-240*f*, a layer-specific weighting value can be obtained for some or all of the cost components. The layer-specific weighting values can be obtained, for example, based on information that is associated with each of the layers 240*a*-240*f* of the roadway 200. As one example, the information can be environmental information describing the roadway. Environmental information can describe any aspect of the physical properties and/or condition of the roadway. For instance, the lateral acceleration weighting factor could be influenced, at least in part by the curvature of the roadway, by a formula that inversely relates the lateral acceleration weighting factor to the curvature of the roadway, such that the lateral acceleration weighting factor decreases as the curvature of the roadway increases. Thus, more lateral acceleration would be accepted within curves, and less on straight roads. Other information for each layer that can be used to influence the weighting factors include the number of lanes of travel, the width of the lane in which the vehicle is travelling, the superelevation rate, vertical curvature, presence of a curb adjacent to the vehicle 100, presence of other vehicles, presence of fixed objects near the roadway, and road surface conditions. The foregoing are examples only, and other environmental information associated with the layers 240a-240f of the roadway can be utilized as a basis for calculating layer-specific weighting factors for each of the cost components.

Figure 6:
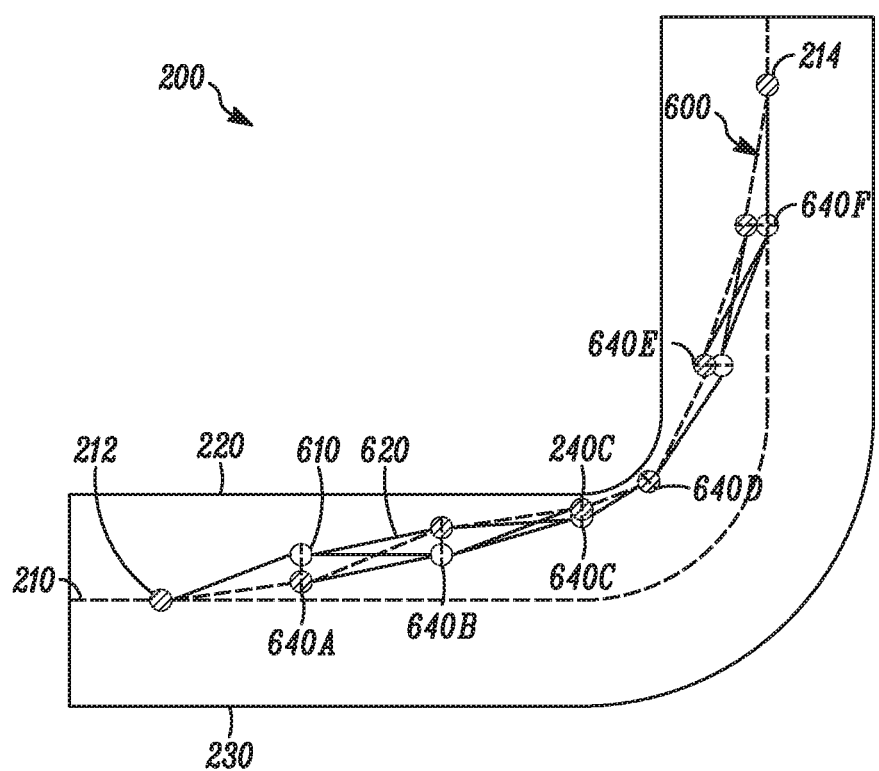
FIG. 6 is an illustration showing the roadway and a second trajectory defined on the roadway between the starting position and the goal position.

FIG. 6 is an illustration showing the roadway 200 and a second trajectory 600 defined on the roadway 200 between the start position 212 and the goal position 214. The second trajectory 600 is determined by the trajectory planning system 140 by using the first trajectory 500 as a starting point, and optimizing the first trajectory by defining refinement nodes 610 in a plurality of refinement layers 640a-640f, and refinement paths 620 that interconnect the refinement nodes 610 in the same manner described with respect to the nodes 300 and paths 400. As similarly described with respect to the first trajectory 500, the second trajectory 600 can be determined using refinement layer cost components and refinement layer-specific weighting factors, and by using a graph search algorithm to find an optimal path from the start position 212 to the goal position 214.

In contrast to the procedure utilized to define the first trajectory 500, the number of refinement nodes 610 is decreased, and the width of each of the refinement layers 640a-640f within which the refinement nodes 610 are placed is smaller than the width utilized when determining the first trajectory 500. For instance, the width of each of the refinement layers 640a-640f can be less than or equal to the width between transversely adjacent nodes 300 in the layers 240a-240f.

In some implementations, the refinement nodes 610 are placed exclusively within a convex hull of the first trajectory 500. The concept of a convex hull is well known in the field of computational geometry, and can be defined as the smallest convex set that containing a given collection of points in a real linear space, where convex set is defined as a set that contains the entire line segment joining any pair of points. With respect to the first trajectory 500 portions of the convex hull of the first trajectory 500 are defined by closed triangles defined by three successive ones of the refinement nodes 610.

Figure 7:
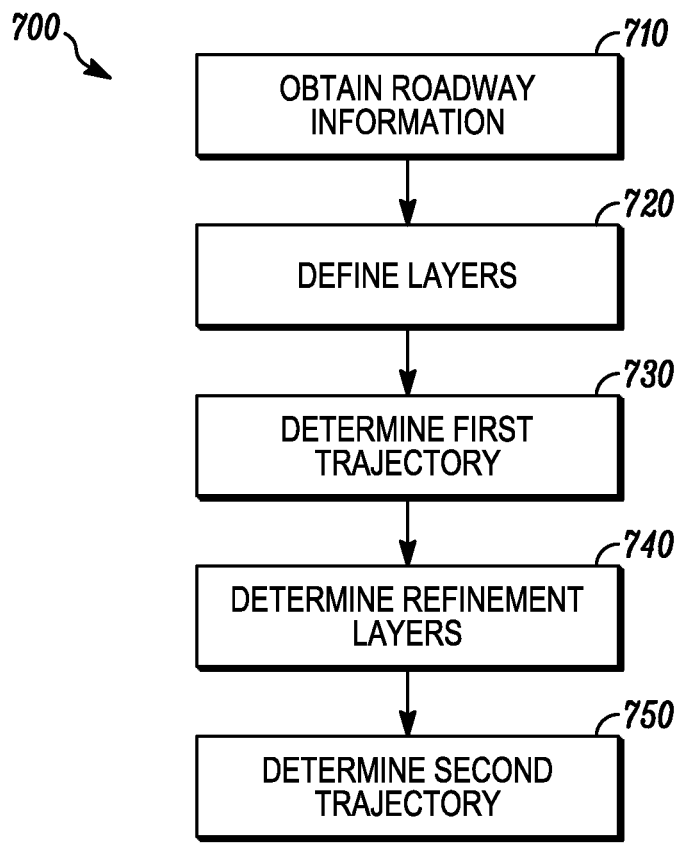
FIG. 7 is a flowchart showing an example of a process for vehicle trajectory optimization.

FIG. 7 is a flow chart showing a process 700 for controlling an autonomous vehicle. The operations described in connection with the process 700 can be performed by one or more computing devices, such as one or more central processing units. For example, the operations described in connection with the process 700 can be performed by one or more computing devices or central processing units that are included in the trajectory planning system 140 of the autonomous vehicle 100. Operations described as being performed by one or more computing devices are considered to be completed when they are completed by a single computing device working alone or by multiple computing devices working together such as in a distributed computing system. The operations described in connection with the process 700 can be embodied as a non-transitory computer readable storage medium including program instructions executable by one or more processors that, when executed, cause the one or more processors to perform the operations. For example, the operations described in connection with the process 700 could be stored at a memory device that is associated with the trajectory planning system 140 and could be executable by a central processing unit or other processor or computing device that is associated with the trajectory planning system 140.

In operation 710, information regarding the roadway 200 is obtained. The information can be obtained by, for example, the trajectory planning system 140. Information can be obtained when it is accessed from memory, read from disk, received over a network, or otherwise made accessible such that it can be utilized. The information regarding the roadway can describe a portion of a roadway from a starting position to a goal position, such as the information described with respect to the roadway 200 between the start position 212 and the goal position 214 including the geometry, extents, and environmental factors associated with the roadway 200.

In operation 720, layers are defined on the roadway. This can be performed by the trajectory planning system 140. Layers are defined, for example, by determining a position along the roadway 200 for each of one or more layers and storing the resulting value in memory. Layers can be defined on the roadway in the manner described with respect to the layers 240a-240f of the roadway 200. As described with respect to the layers 240a-240f, the layers can be defined such that each layer has a first width, and each layer has a plurality of nodes that are spaced from one another transversely with respect to the roadway within the first width.

In operation 730, a first trajectory is defined. The first trajectory can be defined by the trajectory planning system in the manner described with respect to the first trajectory 500 as explained in connection with FIGS. 2-5. For instance, the first trajectory can be defined from the starting position to the goal position by minimizing a cost value associated with traversing the layers. Minimizing a cost value associated with traversing the layers can include, for each layer, determining layer-specific weighting factors for each of a plurality of cost components. The layer-specific cost components can be determined for each layer based on information associated with the respective layer as previously described. Minimizing a cost value associated with traversing the layers can also include determining, for each node of the respective layer, a cost for travelling to one or more of the nodes in a subsequent layer based on the plurality of cost components and the layer-specific weighting factors.

Operation 740 includes defining refinement layers, which can be performed by the trajectory planning system 140. Refinement layers are defined, for example, by determining a position along the roadway 200 for each of one or more refinement layers and storing the resulting value in memory. Layers can be defined on the roadway in the manner described with respect to the layers 640a-640f of the roadway 200. The refinement layers can be defined along the roadway at spaced locations between the starting position and the goal position, each refinement layer having a second width that extends transversely outward from the first trajectory and is smaller than the first width. Each layer can have a plurality of refinement nodes that are spaced from one another transversely with respect to the roadway.

In operation 750, a second trajectory is defined. The second trajectory can be defined by the trajectory planning system 140 in a manner similar to the manner described with respect to the first trajectory 500 as explained in connection with FIGS. 2-5, and further as described in connection with the second trajectory 600 and FIG. 6. In some implementations, determining the second trajectory includes determining refinement layer-specific weighting factors for each of a plurality of refinement cost components, based on information associated with the respective refinement layer, and determining, for each node of the respective layer, a cost for travelling to one or more of the nodes in a subsequent refinement layer based on the plurality of refinement cost components and the refinement layer-specific weighting factors.

The second trajectory is an optimized trajectory that can be utilized to control the vehicle. In some implementations, however, the refinements described in connection with the second trajectory are not performed, and instead, the first trajectory is utilized to control the vehicle. In order to control the vehicle, the trajectory planning system 140 generates an output signal and provides the output signal to the steering control system 150.

In some implementations, the output signal that is provided to the steering control system 150 by the trajectory planning system 140 is the trajectory itself (e.g. a set of positions along the roadway), which is utilized by the steering control system 150 to determine steering angles that will cause the vehicle 100 to follow the trajectory. In other implementations, the trajectory planning system 140 generates the output signal as a set of steering angles that are utilized by the steering control signal. In either case, the steering control system 150 drives operation of the steering device 116 to achieve the desired steering angles. The trajectory can be converted into steering angles in any of a number of well-known ways. As an overly simplistic example, at each node, the steering angle is momentarily set to the angular deviation between successive segments of the path. Refinements of this simple example include fitting a spline to the trajectory and incrementally changing the steering angle to cause the vehicle to follow the path. In some implementations, a vehicle dynamics model is utilized to model the behavior of the vehicle at certain speeds and conditions, to better approximate the manner in which the vehicle will respond to steering inputs, as is known in the art.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for controlling an autonomous vehicle, comprising:
   obtaining, by one or more processors, information describing a roadway from a starting position to a goal position;
   defining, by the one or more processors, a plurality of layers along the roadway at spaced locations between the starting position and the goal position, each layer having a respective first width, and each layer having a plurality of nodes that are spaced from one another transversely with respect to the roadway within the respective first width;
   determining, by the one or more processors, a trajectory from the starting position to the goal position, by minimizing a cost value associated with traversing the layers, including, for each layer:
   obtaining a plurality of cost components;
   obtaining information associated with the respective layer;
   determining layer-specific weighting factors for each of the plurality of cost components, based on the information associated with the respective layer, and
   determining, for each node of the respective layer, a cost for travelling to one or more of the nodes in a subsequent layer based on the plurality of cost components and the layer-specific weighting factors;
   defining a plurality of refinement layers along the roadway at spaced locations between the starting position and the goal position, each refinement layer having a respective second width that extends transversely outward from the trajectory and is less than or equal to a transverse width between transversely adjacent pairs of the nodes from each layer of the plurality of layers, and each layer having a plurality of refinement nodes that are spaced from one another transversely with respect to the roadway;
   modifying the trajectory by minimizing a cost value associated with traversing the refinement layers, wherein modifying the trajectory includes, for each refinement layer:
   determining refinement layer-specific weighting factors for each of a plurality of refinement cost components, based on information associated with the respective refinement layer, and
   determining, for each refinement node of the respective refinement layer, a cost for travelling to one or more of the refinement nodes in a subsequent refinement layer based on the plurality of refinement cost components and the refinement layer-specific weighting factors;
   outputting a steering control signal based on the trajectory to a steering device for controlling operation of the steering device; and
   changing a steering angle of at least one steered wheel using the steering device in response to the steering control signal.

2. The method of claim 1, wherein the plurality of cost components includes a distance travelled value, wherein the distance travelled value represents travelling to a respective one of nodes in the subsequent layer.

3. The method of claim 1, wherein the plurality of cost components includes a cross-track error value representing a transverse distance of each node from a central track of the roadway.

4. The method of claim 1, wherein the plurality of cost components includes a lateral acceleration value.

5. The method of claim 1, wherein the information associated with the respective layer includes environmental information describing the roadway adjacent to the respective layer.

6. A control apparatus for an autonomous vehicle, comprising:
   one or more processors; and
   one or more memory devices for storing program instructions used by the one or more processors, wherein the program instructions, when executed by the one or more processors, cause the one or more processors to:
   obtain information describing a roadway from a starting position to a goal position;
   define a plurality of layers along the roadway at spaced locations between the starting position and the goal position, each layer having a respective first width, and each layer having a plurality of nodes that are spaced from one another transversely with respect to the roadway within the respective first width; and determine a trajectory from the starting position to the goal position, by minimizing a cost value associated with traversing the layers, including, for each layer: obtaining a plurality of cost components,
obtaining information associated with the respective layer,
determining layer-specific weighting factors for each of the plurality of cost components, based on the information associated with the respective layer, and
determining, for each node of the respective layer, a cost for travelling to one or more of the nodes in a subsequent layer based on the plurality of cost components and the layer-specific weighting factors;
define a plurality of refinement layers along the roadway at spaced locations between the starting position and the goal position, each refinement layer having a respective second width that extends transversely outward from the trajectory and is less than or equal to a transverse width between transversely adjacent pairs of the nodes from each layer of the plurality of layers, and each layer having a plurality of refinement nodes that are spaced from one another transversely with respect to the roadway;
modify the trajectory by minimizing a cost value associated with traversing the refinement layers, wherein modifying the trajectory includes, for each refinement layer:
determining refinement layer-specific weighting factors for each of a plurality of refinement cost components, based on information associated with the respective refinement layer, and
determining, for each refinement node of the respective refinement layer, a cost for travelling to one or more of the refinement nodes in a subsequent refinement layer based on the plurality of refinement cost components and the refinement layer-specific weighting factors;
output a steering control signal based on the trajectory to a steering device for controlling operation of the steering device; and
change a steering angle of at least one steered wheel using the steering device in response to the steering control signal.

7. The control apparatus of claim 6, wherein the plurality of cost components includes a distance travelled value, wherein the distance travelled value represents travelling to a respective one of nodes in the subsequent layer.

8. The control apparatus of claim 6, wherein the plurality of cost components includes a cross-track error value representing a transverse distance of each node from a central track of the roadway.

9. The control apparatus of claim 6, wherein the plurality of cost components includes a lateral acceleration value.

10. The control apparatus of claim 6, wherein the information associated with the respective layer includes environmental information describing the roadway adjacent to the respective layer.

11. An autonomous vehicle, comprising:
a trajectory planning system that includes one or more processors and one or more memory devices for storing program instructions used by the one or more processors, wherein the program instructions, when executed by the one or more processors, cause the one or more processors to:
obtain information describing a roadway from a starting position to a goal position,
define a plurality of layers along the roadway at spaced locations between the starting position and the goal position, each layer having a respective first width, and each layer having a plurality of nodes that are spaced from one another transversely with respect to the roadway within the respective first width,
determine a trajectory from the starting position to the goal position, by minimizing a cost value associated with traversing the layers, including, for each layer, obtaining a plurality of cost components, obtaining information associated with the respective layer, determining layer-specific weighting factors for each of a plurality of cost components, based on information associated with the respective layer, and determining, for each node of the respective layer, a cost for travelling to one or more of the nodes in a subsequent layer based on the plurality of cost components and the layer-specific weighting factors,
define a plurality of refinement layers along the roadway at spaced locations between the starting position and the goal position, each refinement layer having a respective second width that extends transversely outward from the trajectory and is less than or equal to a transverse width between transversely adjacent pairs of the nodes from each layer of the plurality of layers, and each layer having a plurality of refinement nodes that are spaced from one another transversely with respect to the roadway,
modify the trajectory by minimizing a cost value associated with traversing the refinement layers, including, for each refinement layer, determining refinement layer-specific weighting factors for each of a plurality of refinement cost components based on information associated with the respective refinement layer, and determining, for each refinement node of the respective refinement layer, a cost for travelling to one or more of the refinement nodes in a subsequent refinement layer based on the plurality of refinement cost components and the refinement layer-specific weighting factors, and
generate an output signal based on the trajectory;
a steering device that is operable to change a steering angle of at least one steered wheel; and
a steering control system operable to receive the output signal from the trajectory planning system and output a steering control signal based on the output signal to the steering device for controlling operation of the steering device, wherein the steering device changes the steering angle of the at least one steered wheel in response to the steering control signal.

12. The autonomous vehicle of claim 11, wherein the plurality of cost components includes a distance travelled value, wherein the distance travelled value represents travelling to a respective one of nodes in the subsequent layer.

13. The autonomous vehicle of claim 11, wherein the plurality of cost components includes a cross-track error value representing a transverse distance of each node from a central track of the roadway.

14. The autonomous vehicle of claim 11, wherein the plurality of cost components includes a lateral acceleration value.

15. The autonomous vehicle of claim 11, wherein the information associated with the respective layer includes environmental information describing the roadway adjacent to the respective layer.

* * * * *